United States Patent [19]
Johnston et al.

[11] 3,807,977
[45] Apr. 30, 1974

[54] ANTISTATIC ADDITIVE COMPOSITIONS

[75] Inventors: Thomas E. Johnston, Wilmington; John W. Matt, Newark, both of Del.

[73] Assignee: E. I. du Pont de Nemours and Company, Wilmington, Del.

[22] Filed: June 30, 1972

[21] Appl. No.: 268,044

[52] U.S. Cl............................. 44/62, 44/66, 44/68, 44/76
[51] Int. Cl............................................. C10l 1/26
[58] Field of Search .................... 44/62, 68, 76, 66; 106/287; 260/414

[56] References Cited
UNITED STATES PATENTS

| | | | |
|---|---|---|---|
| 3,256,073 | 6/1966 | Hess | 44/62 |
| 2,683,156 | 7/1954 | Iler | 106/287 |
| 2,273,040 | 2/1942 | Iler | 260/414 |
| 3,442,790 | 5/1969 | Burkard et al. | 44/62 |
| 3,013,868 | 12/1961 | Skei et al. | 44/62 |
| 3,126,260 | 3/1964 | Vander Minne et al. | 44/62 |
| 3,012,969 | 12/1961 | Vander Minne et al. | 44/DIG. 2 |

*Primary Examiner*—Daniel E. Wyman
*Assistant Examiner*—Y. H. Smith

[57] ABSTRACT

Antistatic compositions comprising
1. olefin-sulfur dioxide copolymer consisting essentially of units derived from sulfur dioxide, $C_{6-1}$-alkene, and optionally an olefin having the formula

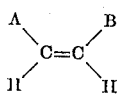

wherein A is a group having the formula $-(C_xH_{2x})-COOH$ wherein $x$ is from 0 to about 17, and B is hydrogen or carboxyl, and
2. polyvalent metal organic compound of a metal having an atomic number of from 22–29.

13 Claims, No Drawings

ANTISTATIC ADDITIVE COMPOSITIONS

BACKGROUND OF THE INVENTION

1. Field of the Invention

This invention relates to novel antistatic compositions of olefin polysulfones and metal organic compounds, and hydrocarbon fuels made conductive for prolonged periods by admixture with said antistatic compositions.

2. Description of the Prior Art

The accumulation of electrical charges in the handling of hydrocarbon fuels is widely recognized in the art as a serious hazard. Spark discharge over flammable fuels because of the accumulation of static electrical charge in the fuels has been considered responsible for numerous explosions and fires. The accumulation of static electrical charge is believed to occur during the movement of hydrocarbon fuels in contact with other substances such as pipes, filters or water. Since the hydrocarbon fuels are normally very poor conductors of electricity, the charge in the fuel is not rapidly dissipated and, where such accumulation of electrical charge reaches a sufficiently high level, the electrical energy is discharged as sparks which can ignite hydrocarbon vapors present in admixture with the air thus causing an explosion or fire.

Procedures undertaken to minimize the explosion hazards caused by static electricity, e.g., grounding of the equipment or blanketing of fuels with inert gas and the modifications in the mechanical handling of the fuels have been of limited value. It is generally recognized in the art that the most practical and promising approach to overcoming the problem is use of a conductivity additive (antistatic additive) in the fuels such that the conductivity characteristics of the hydrocarbon fuel are increased thus preventing the accumulation of a high level of electrical charge within the fuel. It is also generally recognized that when the hydrocarbon fuel has a conductivity of at least about 50 picomhos per meter the danger is reduced, and such hydrocarbon fuel may be safely handled, although often a preference is expressed for a conductivity of at least 200 picomhos per meter to provide additional margin of safety.

Numerous materials have been suggested in the art for use in increasing the electrical conductivity of hydrocarbon fuels. The conductivity additives suggested are generally polyvalent metal organic salts of metals of atomic number of from about 12 to about 29 of the Periodic Table. Since electrical conductivity depends upon the presence of ions, the antistatic additives are almost always ionic compounds. Thus Minne et al. in U.S. Pat. No. 3,012,969 have suggested a combination of calcium or chromium diisopropyl salicylate with other salts, such as salts of dialkylsulfosuccinate. Hess in U.S. Pat. No. 3,256,073 discloses liquid hydrocarbons which contain organic metal salts of carboxylic, phosphoric and sulfonic acids together with organophosphate salt of basic aminoalkylacrylate polymer. Skei et al. in U.S. Pat. No. 3,013,868 disclose a conductivity additive composition comprising an aromatic acid salt of a metal having an atomic number from 22-28 and a nitrogen-containing copolymer. The purpose of the nitrogen containing copolymer is to improve the retention of conductivity values over a longer period of time.

It is recognized that a conductivity additive composition must not only increase the electrical conductivity of the substrate fuel but should in addition (1) maintain the increased conductivity over a sufficiently long period of time to allow for transportation and storage of fuels and (2) be resistant to removal from the fuel when brought into contact with water. For, while some polyvalent metal salts are useful in increasing conductivity initially, they gradually lose conductivity over a period of time (cf. U.S. Pat. No. 3,013,868, col. 2, lines 24-27). When the hydrocarbon fuels are, as is frequently the case, unavoidably exposed to water during storage or during transportation (1) the conductivity additive may be extracted into the water phase thus depleting the protection afforded by the additive to the hydrocarbon phase or (2) the ability of the fuel to separate itself from water is changed, disturbing the efficiency of water separation process, such that the hydrocarbon fuel will contain undesirable amount of water.

Novel antistatic compositions have now been discovered which (1) confer increased conductivity of a prolonged nature to hydrocarbon fuels, (2) are resistant to removal from the fuel when brought in contact with water and (3) do not affect the water separation index of the hydrocarbon fuels.

SUMMARY OF THE INVENTION

This invention is directed to antistatic compositions comprising (1) a polysulfone copolymer consisting essentially of about 50 mol percent of units derived from sulfur dioxide, from about 40 to 50 mol percent of units derived from 1-alkene of 6 to 24 carbon atoms and optionally from 0 to about 10 mol percent of units derived from an olefin having the formula

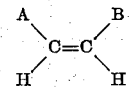

wherein A is a group having the formula $-(C_xH_{2x})-COOH$ wherein $x$ is from 0 to about 17, and B is hydrogen or carboxyl, with the proviso that when B is carboxyl, $x$ is 0 and wherein A and B together may be a dicarboxylic anhydride group and (2) a suitable polyvalent metal organic compound such as those selected from the group consisting of hydrocarbon soluble aliphatic hydrocarbon carboxylate, monoalkyl phosphate, dialkyl phosphate, alkyl mercaptide, Werner-type complex and mixtures thereof. The metal of the metal organic compound has an atomic number of from 22-29. The weight ratio of the polysulfone copolymer to the metal organic compound is from about 5:1 to about 500:1.

DESCRIPTION OF THE INVENTION

The antistatic compositions of this invention consist essentially of (1) polysulfone copolymer derived from the copolymerization of sulfur dioxide with 1-alkene of 6 to 24 carbon atoms and an optional olefin having the formula indicated above and (2) a polyvalent metal organic compound of a metal having an atomic number of from 22-29 in the Periodic Table. The metal organic compound may be selected from the group consisting of hydrocarbon soluble aliphatic carboxylates, monoalkyl phosphates, dialkyl phosphates, mercaptides and Werner-type complexes and mixtures thereof. The weight ratio of the polysulfone copolymer to the metal organic compound is from about 5:1 to about 500:1.

Also included within the scope of this invention are liquid hydrocarbon fuels of high electrical conductivity consisting essentially of a hydrocarbon boiling in the range of 70°F. to about 700°F. and the antistatic composition as defined above in an effective antistatic amount preferably from $1 \times 10^{-8}$ to $1 \times 10^{-4}$ gram atom of metal per kilogram of the hydrocarbon liquid.

Also included within the scope of this invention is a process for rendering liquid hydrocarbons highly conductive by adding to the said hydrocarbons, an effective antistatic amount of the above-defined antistatic composition.

The antistatic compositions of the present invention comprise a combination of two classes of compounds, namely, (1) polysulfones and (2) metal organic compounds.

1. Polysulfones

The polysulfone copolymers useful in the invention are copolymers consiting essentially of about 50 mol percent of units derived from (1) $SO_2$, i.e., sulfur dioxide, from about 40 to about 50 mol percent of units derived from (2) $CH_2=CHR$ wherein R is an alkyl group of from about 4 to 22 carbon atoms, i.e., 1-alkenes of about 6 to 24 carbon atoms and optionally from 0 to about 10 mol percent of units derived from an olefin having the formula

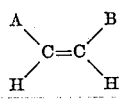

wherein A is a group
having the formula $-(C_xH_{2x})-COOH$ wherein $x$ is from 0 to about 17 and B is hydrogen or carboxyl with the proviso that when B is carboxyl, $x$ is 0 and wherein A and B together may be a dicarboxylic anhydride group. The polysulfone copolymers, often designated as olefin-sulfur dioxide copolymer, olefin polysulfones, or poly(olefin sulfone) are linear polymers wherein the structure is considered to be that of alternating copolymers of the olefins and sulfur dioxide, having a one-to-one molar ratio of the comonomers with the olefins in head to tail arrangement. Since the polysulfones are inexpensive and are usually light-colored, amorphous, readily moldable and extrudable, considerable effort has been expanded to prepare new types or to improve the properties of the polymer for a general use as a thermoplastic polymer. The polysulfones used in this invention are readily prepared by the methods known of the art (cf. Encyclopedia of Polymer Science and Technology Vol. 9, Interscience Publishers, page 460 et seq.). The reaction leading to polysulfone formation is considered to be a free radical polymerization process. Almost all types of radical initiators are effective in initiating polysulfone formation. Radical initiators such as oxygen, ozonides, peroxides, hydrogen peroxide, ascaridole, cumene peroxide, benzoyl peroxide, azobisisobutyronitrile are examples of some of the useful initiators. Polysulfone formation can also be initiated by irradiation with visible light. While polysulfones prepared by any of the methods of the art are useful in the present invention, the preferred product is that prepared by ultra-violet light induced polymerization of 1-alkene and sulfur dioxide in the presence of azobisisobutyronitrile in a solvent such as toluene with a small amount of dodecyl mercaptan (from about 0.002 to 0.03 mole per mole of olefin) as a molecular weight modifier. The weight average molecular weight of the polysulfones useful in this invention is in the range from about 10,000 to about 1,500,000 with the preferred range being from about 50,000 to about 900,000 and the most preferred molecular weights being in the range of from about 100,000 to about 500,000. Olefin polysulfones whose molecular weights are below about 10,000, while effective in increasing conductivity in hydrocarbon fuels, do not appear to increase the conductivity values as much as olefin polysulfones of higher molecular weights. Olefin polysulfones whose molecular weights are above about 1,500,000 are difficult to produce and are more difficult to handle. The molecular weights of the olefin polysulfones may be determined by any of the well known methods, such as the light scattering method. It is generally more convenient, however, to determine the inherent viscosity of the polymer to derive the approximate molecular weight range of the polysulfones therefrom. Inherent viscosity is defined as $\eta_{inh.} = \ln.\eta_{rel}/C$ wherein ln is the natural logarithm, $\eta_{rel}$ is a relative viscosity, i.e., ratio of the viscosity of the polymer solution to the viscosity of the polymer solvent and C is concentration of polymer in g./100 ml. The units of inherent viscosity are deciliters per gm. The inherent viscosities of olefin polysulfones are conveniently measured in toluene at 30°C. as 0.5 weight perecent solutions. It has been found by comparison with molecular weight determinations that olefin polysulfones with inherent viscosities of between about 0.1 dl/g to about 1.6 dl/g correspond to weight average molecular weights in the range of about 50,000 to about 900,000. The control of the molecular weights of the olefin polysulfones in the desired range is readily accomplished by those skilled in the art of polymer science by controlling the polymerization conditions such as the amount of initiator used, polymerization temperature and the like or by using molecular weight modifiers such as dodecyl mercaptan. The amount of molecular weight modifier required to obtain the desired molecular weight range will depend upon the particular 1-olefin being polymerized with sulfur dioxide, however the requisite amount can be readily determined with few experiments. Generally the amount of modifier, such as dodecyl mercaptan, used to obtain the molecular weights in the range of 50,000 to 900,000 is in the range of up to about 0.007 mole per mole of 1-olefin.

The olefins useful for the preparation of the polysulfones are 1-alkenes of about 6 to 24 carbon atoms. The 1-alkenes are generally available commercially as pure or mixed olefins from petroleum cracking process or from the polymerization of ethylene to a low degree. The useful 1-alkenes include for example 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonodecene, 1-eicosene, 1-heneicosene, 1-docosene, 1-tricosene and 1-tetracosene. While the normal straight chain 1-alkenes are preferred, it is understood that 1-alkenes containing branched chains are also useful. It is also understood that a mixture of 1- alkenes may be used and may often be desirable since a mixture of 1-alkenes are often obtainable at a lower cost than are pure olefins. The olefin portion of the polysulfone should be an olefin of at least 6 carbon atoms to insure that the polysulfone is sufficiently soluble in hydrocarbons. For practical and economic reasons, the olefin used for the preparation of polysulfone should have less than about 24 carbon atoms. The preferred olefins will have from about 8 to about 12 carbon atoms, the most preferred olefin having 10 carbon atoms, i.e., 1-decene polysulfone.

The olefin polysulfones of the invention may also optionally contain in copolymerized form 0 to 10 mol percent of an olefin of the formula

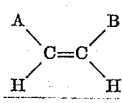

wherein A is a group represented by the formula $(C_xH_{2x})$—COOH wherein $x$ is 0 to 17 and B is selected from the group consisting of hydrogen and carboxyl with the proviso that when B is a carboxyl then $x$ is 0, and wherein A and B taken together may be a dicarboxylic anhydride group. When maleic anhydride is copolymerized with a 1-olefin and sulfur dioxide, the resulting copolymer will contain the dicarboxylic anhydride group. The dicarboxylic anhydride group in the polymer is readily converted to two carboxyl groups by simple acid hydrolysis. In the olefin of the formula

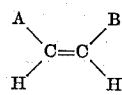

when B is hydrogen, the olefin will be a terminally unsaturated alkenoic acid represented by $CH_2=CH-(C_xH_{2x})$—COOH. The alkylene group bridging the vinyl and the carboxyl groups will have from 1 to 17 carbon atoms or it may be absent, and such alkylene group when present may be straight chain group or branched chain. The useful acids are alkenoic acids of 3 to 20 carbon atoms wherein the olefinic group is a terminal group. Representative but nonlimiting examples of alkenoic acids with a terminal olefinic group include acrylic acid, 3-butenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 13-tetradecenoic acid, 15-hexadecenoic acid. 17-octadecenoic acid as well as branched chain alkenoic acids with terminal olefinic groups such as 2-ethyl-4-pentenoic acid, 2,2-dimethyl-4-pentenoic acid, 3-ethyl-6-heptenoic acid, 2-ethyl-6-heptenoic acid, 2,2-dimethyl-6-heptenoic acid and the like. It is also understood that a mixture of alkenoic acids may be used.

2. Metal Organic Compound

The metal organic compounds of the invention are compounds or mixtures of compounds of metals having atomic number of from 22–29 in the Periodic Table. By Periodic Table is meant "Periodic Table of the Elements" published and copyrighted (1968) by Sargent-Welch Scientific Co., Chicago, Illinois. The metals of atomic number of from 22–29 in the above Periodic Table include titanium, vanadium, chromium, maganese, iron, cobalt, nickel and copper. By metal organic compound is meant, an organic compound containing metal in positive ionic form, said metal ions being held principally by a negatively charged organic anion. These metal organic compounds are exemplified by carboxylic acid salts, monoalkyl and dialkyl phosphoric acid salts, mercaptides and Werner-type complexes. The salts must be soluble in the hydrocarbon to be protected, however, the concentration required is so low that only a limited solubility is required. It has been found that if the organic portion of the metal organic compound contains at least a carbon chain of about 8 carbon atoms, the metal organic compound is of sufficient solubility to be useful.

The carboxylic acid salts are salts of aliphatic hydrocarbon carboxylic acids and are prepared by well-known methods of the art, e.g., treating an oxide of the metal with the appropriate acid. These salts may be represented by the formula $(R'COO)_nM$ where R is an alkyl group of from 7–19 carbon atoms and $n$ is the valence of the metal M. The carboxylic acid salts based on fatty acids of from about 8 carbon atoms to about 20 carbon atoms are useful and include octanoic nonaoic, decanoic, undecanoic, dodecanoic, tridecanoic, tetradecanoic, pendadecanoic, hexadecanoic, heptadecanoic, octadecanoic, nonodecanoic and eicosanoic and the like. It is understood that the above-mentioned acids may be straight chain or branched chain aliphatic acids. It is also understood that a mixture of one or more acids may be used to form a mixture of metal organic compounds.

With respect to the mono- and dialkyl phosphates, a mixture of the metal phosphates containing both the monoalkyl and the dialkyl phosphate is preferred primarily because of the convenience and the lower cost of preparation. By mono- and dialkyl phosphate is meant the metal salts of mono- and dialkyl esters of or-tho-phosphoric acid wherein either one (mono-) or two (di-) of the three acidic hydrogens of the orthophosphoric acid have been replaced by alkyl groups. The monoalkyl phosphate has the formula

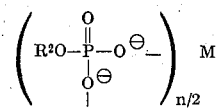

wherein $R^2$ is an alkyl group having from 5 to 18 carbon atoms and $n$ is the valence of the selected metal M. The dialkyl phosphate has the formula

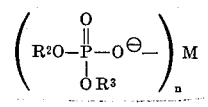

wherein $R^2$ and $R^3$ are the same or different alkyl groups each having from 5 to 18 carbon atoms and $n$ is the valence of the selected metal M.

The monoalkyl dihydrogen phosphate and the dialkyl hydrogen phosphate which are used to prepare the metal phosphates may be readily prepared as a mixture according to the general methods of the art which involve reacting an alcohol with phosphorous pentoxide $(P_2O_5)$. From about 2 to about 4 moles of the alcohol may be used per mole of $P_2O_5$. Preferably about 3 moles of alcohol per mole of $P_2O_5$ is used. When this 3:1 mole ratio of the alcohol to $P_2O_5$ is used, the resultant phosphate should be an equimolar mixture of monoalkyl dihydrogen phosphate and dialkyl hydrogen phosphate, but depending upon the particular alcohol and the reaction conditions used, the mixture may contain from about 40 mole percent to about 60 mole percent of the monoalkyl dihydrogen phosphate and from about 40 mole percent to about 60 mole percent of the dialkyl hydrogen phosphate. The alcohols suitable for the reaction with $P_2O_5$ to obtain metal phosphates used in the invention, which are of satisfactory solubility in hydrocarbon, are alcohols of from about 5 to about 18 carbon atoms and include pentanols, hexanols, heptanols, octanols, nonanols, decanols, undecanols, dodecanols, tridecanols, tetradecanols, pentadecanols, hexadecanols, heptadecanols, and octadecanols. The alcohols may be straight chain alcohols or may be branched chain alcohols, the primary alcohols being preferred. The preferred alcohol is the primary branched chain, tridecyl alcohol prepared by the art-known Oxo-process. As mentioned earlier, it is preferred that a mixture of monoalkyl dihydrogen phosphate and dialkyl hydrogen phosphate is used to prepare the metal phosphates primarily because of the convenience and lower cost, but monoalkyl dihydrogen phosphate or dialkyl hydrogen phosphate may be used singly, if desired. It is also possible in the above described reaction of alcohols with $P_2O_5$ to use a mixture of alcohols to obtain a mixture of monoalkyl and dialkyl phosphate esters wherein the alkyl groups are different. By way of illustration, using a mixture of pentanol and octanol, the resulting phosphate esters will contain mono(pentyl)-phosphate, mono(octyl)phosphate, di(pentyl)phosphate, di(octyl)-phosphate and pentyl-octyl-phosphate. The metal derivatives of such a mixture are equally effective in this invention. The metal derivatives of monoalkyl dihydrogen phosphate and of dialkyl hydrogen phosphate are readily prepared by known methods of the art such as reacting the metal halides or the metal oxides with the acidic phosphates.

The alkyl mercaptides of metals of atomic number of 22–29 can be obtained by any of the art-known methods. For example, cupric mercaptide is readily prepared by dissolving the appropriate alkyl mercaptan in alcohol and then treating the alcohol solution with a slight excess of copper sulfate. On cooling, the precipitated copper mercaptide is collected and dried. The above general process can be used with the soluble metal salts of the metals of atomic numbers 22–29. The metal mercaptides may also be prepared by the action of the metal oxides on the appropriate mercaptan. The mercaptides useful in this invention are those prepared from mercaptans containing from about 8 to 16 carbon atoms and have the formula $(R^4S)_nM$ wherein $R^4$ is an alkyl group of from 8 to 16 carbon atoms and $n$ is the valence of the selected metal M.

The most preferred metal organic compound to be used with the polysulfone copolymer, to make an antistatic composition of this invention, is the Werner-type complex of a carboxylic acid and basic metal halides. The Werner-type complex of carboxylic acid and basic chromium chloride, for example, has been assigned the formula represented by

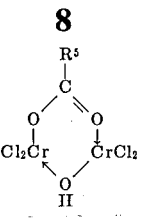

wherein $R^5$ represents that portion of the carboxylic acids attached to the carboxyl group. The chromium Werner-type complexes are prepared from carboxylic acids containing from about 8 to about 20 carbon atoms with basic chromium halide by processes described by Iler in U.S. Pat. No. 2,273,040 and in U.S. Pat. No. 2,683,156. The preferred Werner-type chromium complexes are prepared from carboxylic acids containing from about 12 to about 16 carbon atoms, the most preferred complex being prepared from myristic acid said complex being represented by the formula

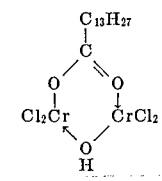

The Werner-type complexes of chromium are distinguished from the ordinary carboxylate salts in that they have much greater solubility in water. The Werner-type chromium complexes of myristic acid and of stearic acid are available as solutions in isopropanol. The commercially available solutions usually contain about 30 percent by weight of the Werner-type complex and about 70 percent by weight of isopropanol and are sold under the proprietary designation "Quilon" M and "Quilon" S, the former being the Werner-type complex prepared from myristic acid while the latter is that prepared from stearic acid.

The polysulfone and the metal organic compound of the present invention may be combined in any manner desired, such as merely mixing the two components, the order of addition being immaterial. The polysulfone or the metal organic compound may be dissolved in any suitable solvent such as isopropanol and then combined.

It has now been found that a combination of polysulfone copolymers and metal organic compounds of the metals of atomic number of 22–29 of the Periodic Table viz: titanium, vanadium, chromium, manganese, iron, cobalt, nickel and copper when added to hydrocarbon liquids, at very low concentration levels, greatly increase the electrical conductivity of the hydrocarbon liquids and that such increased conductivity is maintained over a long period of time. The weight ratio of the polysulfone copolymer to the metal organic compound in the antistatic compositions of this invention may be in the range of from about 5:1 to about 500:1 and the amount of the antistatic composition used in the hydrocarbon liquid may be in the range of about 1 p.p.m. (part per million) to about 20 p.p.m., although much higher concentrations may be used if desired. The use of metal organic compounds in amounts greater than that required to obtain the desired conductivity should, in general, be avoided in order to avoid possible harmful effects of the metals on the hydrocarbon. The amount of metal organic compound used to obtain the desired conductivity, (i.e., from about 1 p.p.m. to about 20 p.p.m. of the polysulfone copolymer-metal organic compound combination in hydrocarbon liquid wherein the weight ratio of the polysulfone copolymer to the metal organic compound is from about 5:1 to about 500:1) is very small, the gram atom of metal ions per kilogram of the hydrocarbon being of the order of from about $1 \times 10^{-8}$ to about $1 \times 10^{-4}$. It is wholly unexpected that the polysulfone copolymer-metal organic compound antistatic compositions of this invention can confer satisfactory electrical conductivity to hydrocarbon liquids when used in very small amounts, and that the increase in electrical conductivity being considerably greater than can be attributed to the conductivity contribution of each component of the antistatic composition. It is equally unexpected that the enhanced electrical conductivity obtained initially does not decrease on storage of the hydrocarbon liquids treated with the antistatic composition of the invention and that in most cases electrical conductivity actually continues to increase with storage. The antistatic compositions of this invention are considered to be even more useful since they do not interfere with the separation of the hydrocarbon liquid from water even when vigorously mixed. It is also surprising that the antistatic activity imparted is retained by the hydrocarbon liquid even after vigorous mixing with water (emulsion formation in WSIM test) and this is particularly true when the metal organic compound used is the Werner-type chromium complex which is known to be greatly water soluble.

The preferred antistatic composition of this invention comprises 1-decene polysulfone having a molecular weight of about 100,000 molecular weight and a Werner-type chromium complex in which the trivalent chromium atoms are coordinated with myristic acid with the weight ratio of 1-decene polysulfone to the Werner-type chromium complex being in the range of from about 16:1 to about 70:1 (weight ratio of polysulfone to chromium metal of from about 78:1 to about 315:1). The preferred antistatic composition may in addition contain solvents used during the preparation of polysulfone such as benzene, toluene, xylenes and the like and a solvent for the Werner-type chromium complex such as ethanol, propanols, butanols and the like.

The use of the antistatic compositions of the present invention is applicable to any liquid hydrocarbon that boils in the distillate fuel range and is prone to accumulate satatic electricity in service. These include hydrocarbon solvents and distillate fuels as exemplified by raw and refined kerosine, gasolines (both automotive and aviation), jet engine fuels, diesel fuels and heating oils. The hydrocarbons which are useful are those whose boiling points are in the range of about 70°F. to about 700°F. The amount of antistatic composition required to obtain the desirable electrical conductivity for the hydrocarbon may be determined readily — usually the higher boiling hydrocarbons requiring lesser amounts of the antistatic composition. The antistatic composition may be used in the presence of other additives which the hydrocarbon products may normally contain such as antiknock agents, detergents, oxidation and rust inhibitors and the like.

EXAMPLES

The folowing examples are intended to be merely illustrative of the invention and not in limitation thereof. Unless otherwise indicated, all quantities are by weight.

EXAMPLE 1

Preparation of 1-Decene Polysulfone

A 3-liter resin flask equipped with a stirrer, a reflux condenser, a thermometer and a gas inlet tube was swept with dry nitrogen. To the flask 400 g. 1-decene, 1430 g. toluene and 2.8 g. of dodecyl mercaptan were added. The contents of the flask was cooled to between 5°C. and 10°C. and addition of sulfur dioxide (180 g.) into the solution was made. Azobisisobutyronitrile, 2.8 g., was then added and a mercury arc lamp was used to irradiate the solution. The stirred charge was kept at 5°C. to 15°C. and at intervals of 4, 8, 12 and 16 hours, an additional total of 1.4 g. of azobisisobutyronitrile was added, the total amount of azobisisobutyronitrile being 5.6 g. The sulfur dioxide addition was continuous throughout the period, a total of 200 g. being added. After a total of 20 hours of continuous irradiation, the mercury lamp was turned off and nitrogen gas was passed into the viscous solution to remove excess sulfur dioxide. After the removal of sulfur dioxide as indicated by the absence of "smoke" when the exit gas was brought into contact with ammonia, a clear viscous solution weighing 1,820 g. was obtained. 1-Decene polysulfone polymer was separated therefrom by removing toluene under reduced pressures and the yield of 1-decene polysulfone was 279 g. (82%). This 1-decene polysulfone polymer had an inherent viscosity of 0.36 as measured in toluene at 30°C. as 0.5 percent solution. The weight average molecular weight of the polymer as determined by light scattering method was 400,000. Elemental analysis of the product established that the product obtained was 1:1 copolymer of 1-decene and sulfur dioxide.

Using the same general procedure described above, 1-alkene polysulfones of other 1-alkenes can be readily prepared. The molecular weight of the polysulfone can be regulated conveniently by using different amounts of dodecyl mercaptan. The amount of dodecyl mercaptan to be used to obtain certain desired molecular weight range can be readily determined by those skilled in the art. The amount of dodecyl mercaptan used is in the range of about 0.002 to about 0.03 mole per mole of 1-alkene.

EXAMPLES 2 – 18

Using the same procedure as described in Example 1, other 1-olefin polysulfones were prepared. Some of the 1-olefin polysulfones with their inherent viscosities are summarized in Table I below.

TABLE I

| Example | Olefin Used | Inherent Viscosity* |
|---|---|---|
| 2 | 1-hexene | 0.97 |
| 3 | 1-octene | 0.21 |
| 4 | 1-octene | 0.29 |
| 5 | 1-octene | 0.45 |
| 6 | 1-octene | 0.87 |
| 7 | 1-decene | 0.14 |
| 8 | 1-decene | 0.14 |
| 9 | 1-decene | 0.58 |
| 10 | 1-decene | 0.90 |
| 11 | 1-decene | 1.24 |
| 12 | 1-decene | 1.40 |
| 13 | 1-decene | 1.46 |
| 14 | 1-decene | 1.57 |
| 15 | 1-decene | 2.14 |
| 16 | 1-dodecene | 0.39 |
| 17 | 1-hexadecene | 0.86 |

TABLE I-Continued

| Example | Olefin Used | Inherent Viscosity* |
|---|---|---|
| 18 | 1-octene/octadecene (10/1) | 0.70 |

* As measured in toluene at 30°C. as 0.5% solution.

EXAMPLE 19

This example shows the preparation of a polysulfone containing 50 mol percent of sulfur dioxide, 45.5 mol per cent of 1-decene and 4.5 mol percent of maleic anhydride. A 1-liter resin flask equipped as described in Example 1 was charged with 140g. 1-decene, 10g. maleic anhydride, 1g. dodecyl mercaptan and 300g. toluene. The contents of the flask were a solution which was cooled to between 5°C. and 10°C. and 80g. of sulfur dioxide was passed into the solution. Azobisisobutyronitrile, 1g. was then added and a mercury arc lamp was used to irradiate the solution. The stirred charge was kept at 5°C. − 10°C. with sulfur dioxide being added continuously at such a rate that it was always in excess. At intervals of 4, 8, 12, and 16 hours, additional 0.5g. portions of azobisisobutyronitrile were added. After 20 hours of irradiation, the mercury arc lamp was turned off, and the addition of sulfur dioxide stopped. The excess sulfur dioxide was removed by passing nitrogen into the viscous solution. A 20g. portion of this solution was dried to give 7.1g. of the polymer. The total solution therefore contained 165g. (77.5 percent yield) of the polymer. The inherent viscosity of the polymer was 0.68. The presence of maleic anhydride in the polymer was demonstrated by infrared spectroscopy. By using the same procedure as described above two additional copolymers were prepared, 1-decene-maleic anhydride-sulfur dioxide copolymer containing in one instance 47.6 mol percent 1-decene, 2.4 mole percent maleic anhydride and 50 mol percent sulfur dioxide and in the second instance 41.7 mol percent 1-decene, 8.3 mol percent maleic anhydride and 50 mol percent sulfur dioxide.

EXAMPLE 20

Using the same procedure as described in Example 19 a polysulfone containing 50 mol percent of sulfur dioxide, 47.6 mol percent of 1-decene and 2.4 mol percent of allylacetic acid (4-pentenoic acid) was prepared.

EXAMPLE 21

Using the same procedure as described in Example 19 a polysulfone containing 50 percent of sulfur dioxide, 47.6 mol percent of 1-decene and 2.4 mol percent of 10-undecenoic acid was prepared.

EXAMPLE 22

This example demonstrates the synergistic conductivity obtained when the polysulfones and the metal organic compounds of the invention are used together. The conductivity of the hydrocarbon fuels were determined with Maihak Conductivity Indicator (H. Maihak A.G., Hamburg, Germany). In operation, the device imposes a potential of 6 volts of direct current on a pair of chromium plated electrodes immersed in the fluid to be tested. The current resulting from this potential, which is of the order of $10^{-9}$ to $10^{-8}$ amperes is amplified and is used to actuate a dial calibrated in conductivity units. A conductivity unit is 1 picomho/meter, that is, 1 reciprocal ohm$^{-12}$/meter. It is believed that to suppress the static charging hazard during aircraft fueling, for example, a fuel conductivity of at least 50 conductivity units is required (R. G. Davies and R. W. Knipple "Experience in Static Dissipator Additive in Aviation Fuels" presented at Society of Automotive Engineers' National Air Transporation Meeting, New York, New York, April 20–23, 1970). It is also generally recognized that to allow for a margin of safety, conductivity units in hydrocarbon fuels of about 200 is desirable.

In this example the polysulfone used was 1-octene polysulfone having a molecular weight of about 100,000. The fuel used was JP-4 Jet Fuel. JP-4 fuel had the following inspection data API gravity 46
Aromatic content 25 vol. %
Olefin content 5 vol. %
Boiling range 50% at 370°F., 40% at 470°F.
The results are summarized in Table II.

TABLE II

| Test No. | 1-Octene Polysulfone (p.p.m.) | Conductivity Fuel: JP-4 Jet Fuel Coadditive | | Conductivity (C.U.) Initial |
|---|---|---|---|---|
| | | p.p.m. | Type | |
| 1 | 0 | 0 | — | 0–10 |
| 2 | 1 | 0 | — | 60 |
| 3 | 4 | 0 | — | 120 |
| 4 | 0 | 1 | Cu (II) octanoate | 0 |
| 5 | 4 | 1 | Cu (II) octanoate | 155 |
| 6 | 0 | 4 | Ti (IV) Mono- and ditridecyl phosphate | 220 |
| 7 | 4 | 1 | Ti (IV) Mono- and ditridecyl phosphate | 485 |
| 8 | 0 | 1 | Cr (III) octadecanoate | 10 |
| 9 | 4 | 1 | Cr (III) octadecanoate | 285 |
| 10 | 0 | 1 | Cr (III) Mono- and di-tridecyl phosphate | 70 |
| 11 | 4 | 1 | Cr (III) Mono- and di-tridecyl phosphate | 860 |
| 12 | 0 | 1 | Cu (II) Pentadecyl-8-mercaptide | 0 |
| 13 | 1 | 1 | Cu (II) Pentadecyl-8-mercaptide | 320 |

These results show that JP-4 jet fuel treated only with metal organic compounds show a relatively low level of conductivity; however, when mixed together with polysulfone the greatly increased conductivity is obtained. Similar results are obtained with other 1-alkene polysulfones, such as those of Examples 2–8.

Werner-type complex and polysulfone is used, satisfactory conductivities are obtained at very low levels of metal ($2.6 \times 10^{-3}$ p.p.m. to $4 \times 10^{-2}$ p.p.m. or $5 \times 10^{-8}$ to $1 \times 10^{-5}$ gram atom of chromium metal per kilogram of hydrocarbon) and that in most cases the conductivity values actually increase in value with time.

TABLE III.—POLYSULFONE/CHROMIUM COMPLEX—CONDUCTIVITY

Fuel: JP-4 Jet Fuel; Polymer: 1-Decene Polysulfone

| Polymer/ "Quilon" M*, wt. ratio | Polymer/ Cr metal, wt. ratio | Polymer plus "Quilon" M, p.p.m. in fuel | Cr metal in fuel | | Conductivity (C.U.) | | | |
|---|---|---|---|---|---|---|---|---|
| | | | P.p.m. | Gr. atm./kg. | Initial | 1 day | 6 days | 15 days |
| 5:1 | 78:1 | 2 | $2.5 \times 10^{-2}$ | $5 \times 10^{-7}$ | 100 | 110 | 80 | 80 |
| 10:1 | 155:1 | 2 | $1.3 \times 10^{-2}$ | $2.5 \times 10^{-7}$ | 60 | 80 | 70 | 70 |
| 20:1 | 315:1 | 4 | $1.3 \times 10^{-3}$ | $5 \times 10^{-7}$ | 85 | 100 | 100 | 120 |
| 100:1 | 1565:1 | 4 | $2.6 \times 10^{-3}$ | $5 \times 10^{-8}$ | 30 | 60 | 70 | 70 |
| 5:1 | 78:1 | 4 | $5.0 \times 10^{-2}$ | $1 \times 10^{-5}$ | 120 | 330 | 260 | 200 |
| 10:1 | 155:1 | 6 | $4.0 \times 10^{-2}$ | $8 \times 10^{-6}$ | 65 | 370 | 300 | 300 |
| "Quilon" M | | | $2.6 \times 10^{-1}$ | $5 \times 10^{-6}$ | 20 | | | |

*"Quilon" M is a 30% solution in isopropanol of

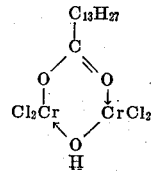

This example demonstrates conductivity obtained when a combination of 1-decene polysulfone and a chromium Werner-type complex is used in JP-4 jet fuel as defined previously. The polymer was 1-decene polysulfone having a molecular weight of about 200,000. The chromium Werner-type complex was that prepared from myristic acid and basic chromium chloride which is commercially available as "Quilon" M, which is a 30 percent solution of the chromium complex compound is isopropanol. The chromium complex compound, as commercially available, was added to a solution of 1-decene polysulfone in toluene to obtain the weight ratio of the polymer/"Quilon" M indicated in Table III. Since "Quilon" M is a 30 percent solution of the chromium complex in isopropanol and the chromium complex has 21.3 percent chromium, the weight ratio of the polymer to the chromium metal is indicated in the second column. The third column indicates the usage level of the polymer- "Quilon" M mixture in the jet fuel in terms of parts per million (p.p.m.). The Similar results are also obtained with other hydrocarbon liquids such as gasolines, fuel oils and kerosine.

EXAMPLE 23 fourth and fifth columns in the Table give the actual concentration of chromium metal in the jet fuel in terms of p.p.m. and in terms of gram atom of chromium per kilogram of the fuel. The data summarized in Table III shows that when the combination of chromium

EXAMPLE 24

This example demonstrates not only the high conductivity of jet fuels treated with polysulfone/"Quilon" M combination but in addition it shows (1) retention of high conductivity values with time, (2) satisfactory separation of the treated jet fuels from water and (3) retention of high conductivity values even after the treatment of fuels with water. Jet fuel was treated with 1-decene polysulfone/"Quilon" M combination of 10:1 and 20:1 at the 6 p.p.m. and 8 p.p.m. levels. After standing for six days the fuels were subjected to a test for water separation characteristics of Aviation Turbine Fuels ASTM Method D2550–66T. In the test WSIM (Water Separation Index, Modified) is measured with as ASTM-CRC Water Separometer, a device in which a water fuel emulsion is prepared and metered through a cell containing a standardized glass fiber coalescer. The cell effluent turbidity, due to entrained water, is measured by light transmission through the fuel to a photo cell. The output of the photo cell is fed to a meter with a 0 to 100 scale, from which the numerical rating of the fuel is read. The higher the number, the more readily does the fuel release water. It should be pointed out that since the water-fuel emulsion is first prepared and then allowed to separate into the fuel component and the water component with the glass fiber coalescer, the WSIM test comprises a very severe test for water-extractability of the fuel additives. The results are summarized in Table IV.

TABLE IV

Conductivity and WSIM
Fuel: JP-4 Jet Fuel
Additive: 1-Decene Polysulfone/"Quilon" M

| Polymer/ "Quilon" M wt. ratio | Polymer/ Cr Metal wt. ratio | Polymer+ "Quilon" M p.p.m. in fuel | Conductivity (C.U.) | | WSIM Test Values | Conductivity (C.U.) after WSIM Test | | |
|---|---|---|---|---|---|---|---|---|
| | | | Initial | 6 Days | | Immediately | 5 Days | 9 Days |
| 10:1 | 155:1 | 6 | 150 | 420 | 96 | 250 | 210 | 215 |
| 20:1 | 315:1 | 6 | 45 | 255 | 94 | 225 | 200 | 220 |
| 20:1 | 315:1 | 8 | 70 | 530 | 95 | 315 | 260 | 260 |

The above results reflect excellent separation of water from the treated fuel and in addition show that the conductivity of the fuel remains at a satisfactory high level after the severe WSIM test.

COMPARATIVE EXAMPLE 25

This example demonstrates that (1) synergistic enhancement of conductivity is not obtained when the metal organic compound is chromium tris (dodecyl salicylate), and (2) monomeric sulfones are also ineffective as synergist when used with chromium tris (dodecyl salicylate). The results are summarized in Table V.

TABLE V

| Additive | Conc. (p.p.m.) | Fuel | Conductivity (picomhos/meter) |
|---|---|---|---|
| 1. Chromium tris (dodecyl salicylate) | 0.5 | Fuel Oil* | 200 |
| 2. 1-Decene polysulfone | 1.0 | Fuel Oil* | 20 |
| 3. Chromium tris (dodecyl salicylate) 1-decene sulfone | 1 1 | Fuel Oil* | 200 |
| 4. Chromium tris (dodecyl salicylate) | 0.25 | Kerosine | 180 |
| 5. di-n-propyl sulfone | 4 | Kerosine | 20 |
| 6. tetramethylene sulfone | 4 | Kerosine | 25 |
| 7. Chromium tris (dodecyl salicylate) di-n-propyl sulfone | 0.25 4 | Kerosine | 175 |
| 8. Chromium tris (dodecyl salicylate) tetramethylene sulfone | 0.25 4 | Kerosine | 250 |

*Domestic heating oil

These results show that when the metal organic compound is chromium tris (dodecyl salicylate), which is outside the scope of this invention, no synergistic conductivity effect is seen when used together with 1-decene polysulfone. It is also seen that when monomeric sulfone (outside the scope of this invention) is used with chromium tris (dodecyl salicylate), the di-n-propyl sulfone does not contribute to conductivity of the hydrocarbon and tetramethylene sulfone has only a very minor synergistic effect on the conductivity.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. An antistatic composition comprising
   1. a polysulfone copolymer consisting essentially of
      a. about 50 mol percent of units derived from sulfur dioxide,
      b. from about 40 to about 50 mol percent of units derived from a 1-alkene or mixture of 1-alkenes having from about 6 to 24 carbon atoms, and
      c. from 0 to about 10 mol percent of units derived from an olefin having the formula

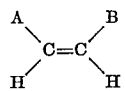

wherein A is a group having the formula $-(C_xH_{2x})-COOH$ wherein $x$ is from 0 to about 17, and B is hydrogen or carboxyl, with the proviso that when B is carboxyl, $x$ is 0 and wherein A and B together may be a dicarboxylic anhydride group, and 2. a polyvalent metal organic compound selected from the group consisting of hydrocarbon soluble
   i. aliphatic carboxylic acid salt having the formula, $(R'COO)_nM$, wherein R' is an alkyl group having from 7 to 19 carbon atoms and $n$ is the valence of the metal M,
   ii. monoalkyl phosphate having the formula

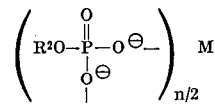

wherein $R^2$ is an alkyl group having from 5 to 18 carbon atoms and $n$ is the valence of the metal M, iii. dialkyl phosphate having the formula

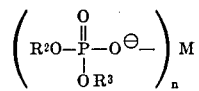

wherein $R^2$ and $R^3$ are the same or different alkyl groups each having from 5 to 18 carbon atoms and $n$ is the valence of the metal M, iv. alkyl mercaptide having the formula $(R^4S)_nM$ wherein $R^4$ is an alkyl group having from 8 to 16 carbon atoms and $n$ is the valence of the metal M, v. Werner-type complex having the formula

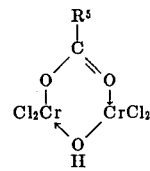

wherein $R^5$ is an alkyl group having from 8 to 20 carbon atoms, and mixtures thereof wherein the metal has an atomic number of from 22 to 29, and wherein the weight ratio of polysulfone copolymer to the metal organic compound is from about 5:1 to about 500:1.

2. An antistatic composition according to claim 1 wherein the 1-alkene of (1)(b) has from 8 to 12 carbon atoms.

3. An antistatic composition according to claim 2 wherein the 1-alkene has 10 carbon atoms.

4. An antistatic composition according to claim 1 wherein the metal organic compound (2) is a carboxylic acid salt having the formula $(R'COO)_nM$ wherein M is a metal, R' is an alkyl group having from 7 to 19 carbon atoms and n is the valence of the metal M.

5. An antistatic composition according to claim 1 wherein the metal organic compound is a monoalkyl phosphate having the formula

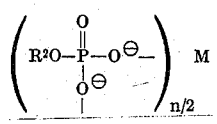

wherein M is a metal, $R^2$ is an alkyl group having from 5 to 18 carbon atoms and $n$ is the valence of the metal M.

6. An antistatic composition according to claim 1 wherein the metal organic compound is a dialkyl phosphate having the formula

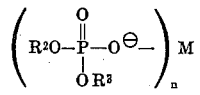

wherein M is a metal, $R^2$ and $R^3$ are the same or different alkyl groups each having from 5 to 18 carbon atoms and $n$ is the valence of the metal M.

7. An antistatic composition according to claim 1 wherein the metal organic compound is an alkyl mercaptide having the formula $(R^4S)_nM$ wherein M is a metal, $R^4$ is an alkyl group having from 8 to 16 carbon atoms and $n$ is the valence of the metal M.

8. An antistatic composition according to claim 1 wherein the metal organic compound is a Werner-type complex having the formula

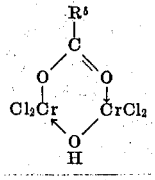

wherein $R^5$ is an alkyl group having from 8 to 20 carbon atoms.

9. An antistatic composition according to claim 8 wherein $R^5$ of the Werner-type complex is an alkyl group having from 12 to 16 carbon atoms.

10. An antistatic composition according to claim 9 wherein the Werner-type complex has the formula

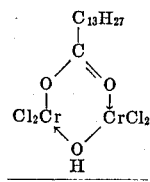

11. An antistatic composition according to claim 1 wherein the 1-alkene of (1)(b) has from 8 to 12 carbon atoms and the metal organic compound of (2) is a Werner-type complex having the formula

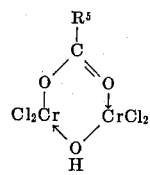

wherein $R^5$ is an alkyl group of from 12 to 16 carbon atoms.

12. An antistatic composition according to claim 11 wherein the 1-alkene has 10 carbon atoms and the metal organic compound is a Werner-type complex having the formula

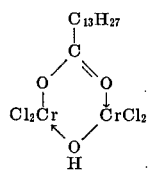

13. A hydrocarbon fuel comprising
A. a liquid hydrocarbon boiling in the range of from about 70°F. to about 700°F., and
B. from about 1 to about 20 p.p.m. of an antistatic composition comprising
   1. a polysulfone copolymer according to claim 1, and
   2. a polyvalent metal organic compound according to claim 1,
wherein the weight ratio of polysulfone copolymer to the metal organic compound is from about 5:1 to about 500:1.

* * * * *